United States Patent [19]
Whateley et al.

[11] 3,817,123
[45] June 18, 1974

[54] GEARING

[75] Inventors: Eric Albert Whateley, Huddersfield;
Eric Alexander Pengilly, Newbury,
both of England

[73] Assignee: **David Brown Gear Industries
Limited,** Huddersfield, England

[22] Filed: June 1, 1971

[21] Appl. No.: 148,622

[30] Foreign Application Priority Data
June 5, 1970   Great Britain.................... 27434/70

[52] U.S. Cl......................... 74/745, 74/331, 74/360
[51] Int. Cl. ........................... F16h 3/02, F16h 3/08
[58] Field of Search...................... 74/745, 331, 360

[56] References Cited
UNITED STATES PATENTS
1,724,159   8/1929   Wittkuhns........................ 74/331 X
2,500,308   3/1950   Campodonico et al............... 74/331
3,138,965   6/1964   Brey et al. ........................... 74/331
3,254,541   6/1966   Schou.................................. 74/360

Primary Examiner—Arthur T. McKeon
Attorney, Agent, or Firm—Norris & Bateman

[57] ABSTRACT

Power transmission gearing has a driving shaft and a driven shaft interconnected by a plurality of layshafts, constituting parallel power paths. Each layshaft is provided with a torque limiting clutch to restrict the maximum torque transmissible by the shaft. Where, for example, two layshafts are provided, the capacity of each torque limiting clutch is rather more than half the maximum torque rating of the power transmission gearing.

6 Claims, 2 Drawing Figures

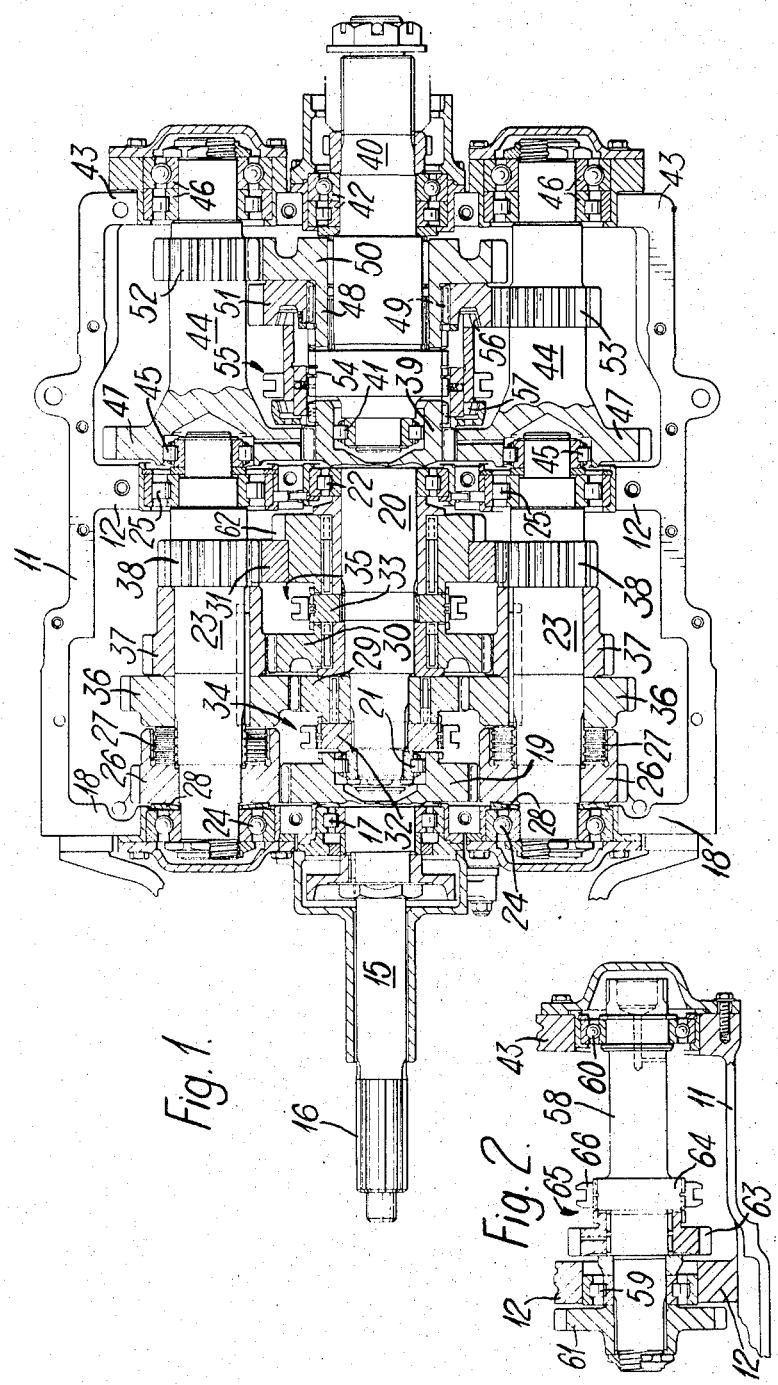

GEARING

BACKGROUND OF THE INVENTION

The invention relates to gearing, and more particularly to power transmission gearing of the type having an input shaft and an output shaft drivably interconnected by means for sharing the torque transmitted comprising a plurality of layshafts constituting parallel power paths.

SUMMARY OF THE INVENTION

The object of the invention is to avoid the need for complex radially floating components for sharing the torque equally between the layshafts as employed hitherto in gearing of the type referred to.

According to the invention, in power transmission gearing having a driving shaft and a driven shaft drivably interconnected by a plurality of layshafts constituting parallel power paths which share the torque transmitted, a gear on one of the shafts meshes with a plurality of gears each of which is drivably connected to one of the layshafts by a torque limiting clutch.

BRIEF DESCRIPTION OF THE DRAWING

A preferred embodiment of the invention will now be described, by way of example only, with reference to the accompanying drawing of which:

FIG. 1 is a sectional side elevation arrangement of a gearbox for a commercial vehicle; and FIG. 2 is a sectional view of reverse gearing in said gearbox.

DESCRIPTION OF THE PREFERRED EMBODIMENT

Referring now to the drawing, a gearbox for a commercial vehicle comprises a single casing 11 with a transverse web 12 housing multi-speed gearing at the front side of said web and two-speed gearing, connected in series with the multi-speed gearing, at the rear side of said web. The multi-speed gearing and the two-speed gearing are also connectible by reverse gearing as hereinafter described. The two-speed gearing acts in known manner to double the number of forward and reverse speed ratios obtainable.

The multi-speed gearing comprises an input shaft 15 adapted to be supported at its projecting front end in a bearing (not shown) housed in the vehicle's engine flywheel (not shown) and adapted to carry on splines 16 the plates of a main power transmission friction clutch (not shown). The shaft 15 is supported near its rear end in a bearing 17 housed in a front wall 18 of the casing 11, and has formed integrally at its rear end an input gear 19. A main shaft 20 co-axial with the input shaft 15 is supported at its front end in a bearing 21 housed in the input gear 19, and adjacent its rear end in a bearing 22 housed in the transverse web 12. Two identical layshafts 23 are disposed parallel to and equidistant from the main shaft 20 on diametrically opposite sides thereof. Each layshaft 23 is supported at its front end in a bearing 24 housed in the front wall 18 of the casing 11 and adjacent its rear end in a bearing 25 housed in the transverse web 12. Adjacent the front end of each layshaft 23 there is mounted a gear 26 which meshes constantly with the input gear 19 and which is drivably connected to its layshaft 23 by a torque limiting multi-plate friction clutch 27 loaded by a Belleville washer 28. The torque limiting clutches 27 are of equal torque transmitting capacity, and the value of the maximum torque transmissible by each of said clutches 27 is substantially greater than half the maximum torque to be transmitted by the gearbox, for example where the maximum torque to be transmitted by the gearbox is 1,100 pound-feet, the maximum torque transmissible by each torque limiting clutch 27 may be 600 pound-feet. Three gears 29, 30 and 31 of different pitch circle diameters are rotatably mounted on the main shaft 20 forward of the transverse web 12, and rigidly secured on said shaft are the hubs 32 and 33 of two double-ended dog clutches 34 and 35 which are operated in known manner by respective selector forks (not shown) and which are provided in known manner with clutch locks to prevent them jumping out of engagement. The clutches 34 and 35 have neutral positions. The clutch 34 enables the input shaft 15 to be drivably connected directly to the main shaft 20 or the gear 29 to be connected to the main shaft, and the clutch 35 enables either one of the gears 30 and 31 to be drivably connected to the main shaft. The gears 29, 30 and 31 mesh constantly with respective pairs of gears 36, 37 and 38. Each pair of gears 36 and 37 is rigidly secured one on each of the layshafts 23, and each of the gears 38 is formed integrally with its layshaft 23. Thus the main shaft 20 can be driven at any one of four speeds relative to the speed of the input shaft 15. At the rear end of the main shaft 20 there is formed integrally a gear 39 which constitutes the forward speed input to the two-speed gearing.

The two-speed gearing comprises an output shaft 40 co-axial with the input and main shafts 15 and 20 which is supported at its front end in a bearing 41 housed in the gear 39 and adjacent its projecting rear end in a bearing assembly 42 housed in a rear wall 43 of the casing 11. Each of two countershafts 44 co-axial with the layshaft 23 is supported at its front end on a bearing 45 surrounding the rear end of the associated layshaft 23, and at its rear end by a bearing assembly 46 housed in the rear wall 43 and adapted to locate the countershaft 44 relative to the casing 11 with no capability of axial movement apart from normal working clearances. The gear 39 meshes constantly with a pair of gears 47 formed integrally one on each of the countershafts 44. A first helical gear 50 is rotatably mounted on the output shaft 40 with the capability of limited axial movement relative to said shaft. The gear 50 has a boss 48 provided with splines 49 on which a second helical gear 51 is mounted. The gears 50 and 51 are of opposite hand but of the same face width, pitch circle diameter and helix angle. Said gears form, in effect, an axially floating double-helical gear assembly having oppositely handed helical toothed zones. The helical gear 50 meshes constantly with a gear 52 formed integrally on one countershaft 44, and the helical gear 51 meshes constantly with a gear 53 formed integrally on the other countershaft 44. The hub 54 of a double-ended dog clutch 55 is formed integrally on the output shaft 40. Said clutch is operated by a selector fork (not shown) and provided with a clutch lock, and is also provided with synchromesh cone clutches 56 and 57. The dog clutch 55 has no neutral position and enables the output shaft 40 to be drivably connected either to the double-helical gear assembly 50, 51 or directly to the main shaft 20.

The reverse gearing comprises a reverse shaft 58 parallel to the other shaft and supported adjacent its front end in a bearing 59 housed in the transverse web 12 and at its rear end in a bearing 60 housed in the rear wall 43 of the casing 11. Rigidly secured on the front end of the reverse shaft 58 is a gear 61 meshing constantly with a gear 62 rigidly secured to the gear 31 which has the largest pitch circle diameter of the three rotatably mounted gears on the main shaft 20 and thus transmits the lowest speed ratio. Rotatably mounted on the reverse shaft 58 is a gear 63 which meshes constantly with one of the gears 47. Formed integrally on the reverse shaft 58 is the hub 64 of a single-ended dog clutch 65 which is operated by a selector fork and provided with a clutch lock. Said dog clutch has a neutral position and enables the gear 63 to be drivably connected to the reverse shaft 58 when both of the dog clutches 34 and 35 are in neutral position.

In operation, an input torque up to the maximum value transmissible by each torque limiting clutch 27 is transmitted entirely by whichever layshaft 23 chances to have its gear 26 in tooth flank contact with the input gear 19. When the torque exceeds said value the torque limiting clutch 27 of said layshaft slips so that the torque in excess of said value is transmitted by the other layshaft. Thus in no circumstances is the torque shared equally between the layshafts 23 of the multi-speed gearing, but when the output shaft 40 is clutched to the double-helical gear assembly 50, 51 the torque is always shared equally between the countershafts 44 of the two-speed gearing due to said assembly being moved axially, by any inequality in the opposed axial components of the loads applied normal to its oppositely handed teeth, into an equilibrium position in which said components exert equal and opposite end thrusts.

We claim:

1. Power transmission gearing having a driving shaft and a driven shaft drivably interconnected by a plurality of layshafts constituting parallel power paths which continuously share the torque transmitted, wherein a gear on one of the two first-mentioned shafts meshes with a plurality of gears each of which is drivably connected to one of the layshafts by a torque limiting clutch.

2. Gearing according to claim 1, wherein two layshafts are provided.

3. Gearing according to claim 1, wherein the torque limiting clutches are multi-plate friction clutches.

4. Gearing according to claim 1, wherein the two first-mentioned shafts are co-axial.

5. Gearing according to claim 4, wherein means is provided whereby the two first-mentioned shafts are capable of being directly connected together.

6. Gearing according to claim 1, wherein a plurality of gears are freely rotatable on the other of the two first-mentioned shafts and are selectively drivably connectible thereto, each of said gears meshing with a plurality of identical gears secured one on each of the layshafts.

* * * * *